United States Patent [19]

Fink et al.

[11] 4,028,218

[45] June 7, 1977

[54] DEFOAMING COMPOSITION AND METHOD OF DEFOAMING AQUEOUS SOLUTIONS OR DISPERSIONS

[75] Inventors: Hans-Ferdi Fink, Essen-Ruttenscheid; Herwig Fritsch, Gladbeck; Götz Koerner, Essen; Gerd Rossmy, Essen-Werden; Günter Schmidt, Essen, all of Germany

[73] Assignee: Th. Goldschmidt AG, Essen, Germany

[22] Filed: Oct. 18, 1974

[21] Appl. No.: 515,847

[52] U.S. Cl. .............................. 252/321; 8/DIG. 1; 252/358
[51] Int. Cl.² ........................................ B01D 19/04
[58] Field of Search ............................ 252/321, 358

[56] References Cited

UNITED STATES PATENTS

| | | | |
|---|---|---|---|
| 3,076,768 | 2/1963 | Boylan | 252/358 |
| 3,207,698 | 9/1965 | Liebling et al. | 252/358 X |
| 3,763,021 | 10/1973 | Householder | 252/321 X |
| 3,865,544 | 2/1975 | Keil | 252/358 X |

*Primary Examiner*—Leland A. Sebastian
*Attorney, Agent, or Firm*—Toren, McGeady and Stanger

[57] ABSTRACT

In the disclosed method of preventing the formation of foam and destroying existing foam in an aqueous solution or dispersion, an effective amount of a composition comprising about 0.2 to 7.5 percent by weight of highly disperse silica or alumina with the balance being methylpolysiloxanepolyoxyalkylene mixed block polymer consisting essentially of a. about 10–60 percent by weight of methylpolysiloxane;
b. with the balance polyoxyalkylene, > 80–100 percent by weight of the polyoxyalkylene block consisting of oxypropylene units, is added to the solution or dispersion.

The application also discloses defoaming preparations or compositions of finely disperse silica or alumina and methylpolysiloxane-polyoxyalkylene mixed block polymer which may be diluted in oily substances. The preparation may optionally comprise non-ionogenic emulsifier of an HLB value of 8 to 14.

13 Claims, No Drawings

DEFOAMING COMPOSITION AND METHOD OF DEFOAMING AQUEOUS SOLUTIONS OR DISPERSIONS

FIELD OF INVENTION

The invention is directed to the defoaming of aqueous solutions or dispersions. The term defoaming as used herein is deemed to indicate both the prevention of foam formation in such aqueous systems and also the destruction of existing foam.

BACKGROUND INFORMATION AND PRIOR ART

It is well known in the art that certain oily substances, as for example mineral oils, polypropylene oxide and polybutadiene have a defoaming activity. This applies particularly to oily substances of relatively low viscosity. Such oily substances exhibiting defoaming characteristics also include oils of vegetable and animal origin as, for example, rape and rape-seed oil, soy oil and train oils. However, it is well known that the defoaming activity of these known oily substances is insufficient in many instances to cause complete and permanent elimination of foam which is normally formed in and by aqueous solutions or dispersions.

More recently, it has been proposed to use siloxane oils, particularly, methylpolysiloxane oils of low to medium viscosity for the indicated purpose. Reference is thus had to the treatise by W. Noll, "Chemie und Technologie der Silicone", Verlag Chemie GmbH, Weinheim, 1968, pages 540 ff.

It has also been proposed to improve the defoaming activity of defoaming agents by the addition of highly disperse inorganic substances, particularly, highly disperse silica, customarily produced in pyrogenic manner and highly disperse aluminum oxide. Pertinent literature citations in this respect are German Pat. No. 1,067,003 and German Offenlegungsschrift No. 1,914,684.

Further, with a view to improving the distribution of the defoaming substances, emulsifiers have been added to the system. In other instances, preparations were directly produced in the form of emulsions. Examples for such defoaming agents in emulsion form are again German Pat. No. 1,067,003 and German Offenlegungsschrift No. 1,914,684 as referred to above.

The most pronounced improvement of the defoaming effect of defoaming preparations, be they in emulsifiable form or in the form of emulsions proper, has been obtained by the use of methylpolysiloxane oils. However, defoaming preparations on the basis of methylpolysiloxane oils cause serious undesired side effects which in many instances make it impossible to use such systems although they have an excellent defoaming activity. A number of such disadvantages and drawbacks of the known methylpolysiloxane oil containing defoamers is enumerated hereinafter, although the listing is by no means complete.

1. For example, if metal working emulsions are defoamed by such defoaming preparations containing silicone oil, a thin film of silicone oil remains on the treated object. This film negatively affects the further processing of the metal articles. For example, subsequent coating with lacquer or varnish or adhesive uniting of the metal articles is greatly imparied by the presence of this thin silicone oil film. The formation and retention of the oily film is peculiar to silicone oil as distinguished from other oils.

2. If such defoamers are added to printing dyes of aqueous or aqueous-alcoholic basis, the defoaming may be satisfactory but the running of the dyes on the printing rollers during the subsequent printing procedure is negatively affected and printing may be rendered extremely difficult. Similar difficulties occur in rotogravure or copper plate printing and other printing procedures since the wetting capability of the printing paste is considerably reduced by the presence of the silicone containing defoaming preparations.

3. If substrates are defoamed which are subjected to fermentation, the presence of the silicone oil containing defoamers causes frequently a significant growth impediment of the bacteria, yeast and other microorganisms causing the fermentation.

4. If textile treating agents are defoamed in the indicated manner, the ultimate textile product frequently has spots caused by the silicone oil in the treating agent. These spots usually can not be removed by washing or the like. This phenomenon occurs particularly if the defoaming preparation is used in excess and is pronounced in dyeing procedures since the dye than takes in an uneven manner on the fabric.

5. Due to the abhesive activity of the silicone oils, defoaming of adhesives, seriously reduces the adhesive force of the adhesive preparations.

6. Foam which is produced in paper producing plants, can also successfully be defoamed with silicone oil containing preparations. However, the printability of the ultimate paper is negatively affected. Further, like in the case of textiles, undesired watermark-like spots are formed.

German Pat. Nos. 1,012,602 and 1,040,251 disclose that certain polysiloxane-polyoxyalkylene mixed block polymers can be used as defoaming agents. However, these two patents clearly indicate that but water soluble mixed block polymers are suitable for defoaming purposes and the skilled artisan reading these patents obtains the distinct impression and prejudice that water insoluble block polymers of the indicated kind are unsuitable for defoaming purposes. In these two patents, the portion of the molecular weight which emanates from the oxyethylene groups is equal or larger than the portions which emanate either from the polysiloxane units or the oxypropylene or oxybutylene units. These prior art water soluble mixed block polymers have a lesser defoaming activity than dimethylpolysiloxane oils. (This will be numerically demonstrated hereinafter. See the comparison tests of Example 6 between formulation B and C.)

German Offenlegungsschrift No. 2,123,573 discloses and claims the use of siloxane-oxyalkylene-copolymers in defoaming preparations, the copolymers being soluble in cold water. German Offenlegugungsschrift No. 2,222,998 discloses siloxane-oxyalkylene-copolymers whose polyether block has a ratio of the number of C atoms to the number of O atoms of 2.3 to 2.8. This means that the oxyethylene units constitute at least 20%. Also, these two publications give the distinct impression that the hydrophilic properties are not permitted to fall below a certain minimum value.

SUMMARY OF THE INVENTION

It is a primary object of the present invention to propose a defoaming composition which is at least as effective as silicone oil containing defoamers, but which does not contain free silicone oil.

Generally, it is an object of the invention to improve on the art of defoaming aqueous systems as presently practiced.

The invention is based on the realization that the desired effect is contingent on the selection of the defoaming substance and the relative proportions of the individual groups or blocks which form the defoaming substance.

Briefly, and in accordance with this invention, it has been ascertained that the above objects are superiorly attained by using a composition comprising about 0.2 to 7.5 percent by weight of highly disperse silica or alumina with the balance being methylpolysiloxane-polyoxyalkylene mixed block polymer consisting essentially of a. about 10–60, preferably 15–30 percent by weight of methylpolysiloxane;

b. with the balance polyoxyalkylene, > 80–100 percent by weight of the polyoxyalkylene block consisting of oxypropylene units.

The block polymer is preferably diluted with oily substances — which are not silicone oils — in a ratio of up to 1 : 100, in which event the composition comprises ence in the composition of the highly disperse inorganic particles, to wit, the finely distributed silica and/or alumina. The oily substances which are suitable for the indicated dilution purposes are those referred to in the introductory portions of this application, to wit, for example, mineral oils, polypropylene oxide, polybutadiene, certain oils of vegetable or animal origin, and the like.

It is critical for the purposes of the present invention that the methylpolysiloxane-polyoxyalkylene mixed block polymer, has a particular composition. Thus, as previously stated, the polymer contains 10 to 60, preferably 15 to 30 percent by weight of methylpolysiloxane blocks while the polyoxyalkylene block or blocks comprise > 80 to 100 percent by weight of oxypropylene units. Contrary to the teaching of German Pat. Nos. 1,012,602 and 1,040,251 and German Offenlegungsschrift Nos. 2,123,573 and 2,222,998, the mixed block polymers of the present invention are not water soluble.

The mixed block polymers to be used in accordance with the invention, can be represented by the following formulas I and II:

Formula I

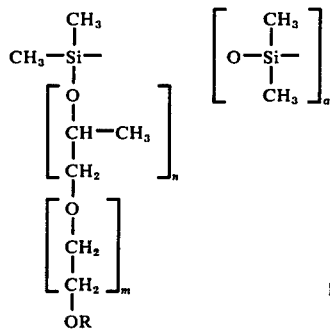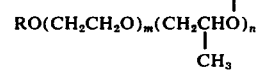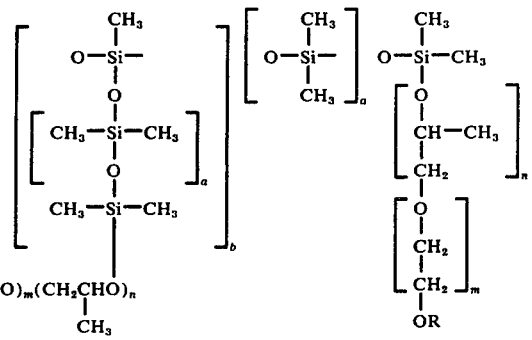

Formula II

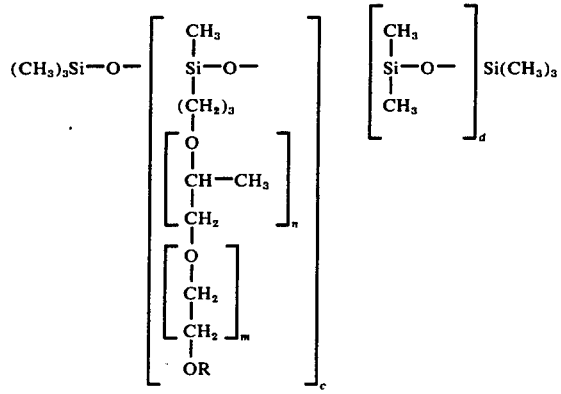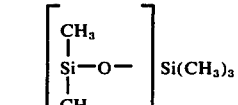

0.2–7.5 percent by weight calculated on the total composition — of silica or alumina, block polymer and oil. In some instances, it may also be suitable to add about 2 to 10 percent by weight, calculated on the entire preparation or composition, of nonionogenic emulsifiers which have on the average an HLB value of 8 to 14 and which are soluble or dispersible in the preparation.

As previously stated, the mixed block polymer which is one of the two principal ingredients of the defoaming agent or preparation, may thus be diluted by silicon-free oily substances of the nature previously referred to, which in themselves have a defoaming action. The defoaming action is still further improved by the preswherein R is alkyl, acyl, aryl or R'—NH—CO—, wherein R' stands for aryl or alkyl;

$c \geq 1$, and the absolute values for $m$, $n$, $c$ and $d$ are the corollary of conditions (a) and (b).

If R and/or R' are alkyl, alkyl groups of 1–4 carbon atoms are preferred. Thus methyl and butyl are recommended. The preferred aryl group for R and R' is phenyl. The preferred acyl group for R is acetyl.

In Formula I the symbols b and m may be zero. In the event that $b=0$, linear products are then involved. The symbols $a$ and $n$ always have finite values. The absolute values of the symbols $m$, $n$, $a$ and $b$ are a corollary or a result of the condition that 10 to 60 percent by weight, preferably 15 to 30 percent by weight of methylpolysiloxane blocks are present, with the remainder, to wit, 40 to 90, preferably 70 to 85 percent by weight, being polyoxyalkylene blocks, the polyoxyalkylene blocks in turn containing > 80 to 100, preferably 100 percent by weight of oxypropylene units. By way of examples it is indicated that the symbols $a$, $b$, $m$ and $n$ may have the following values:

$a = 6$
$b = 2.1$
$m = 0$
$n = 30$.

Turning now to Formula II, it is a condition that $c \geq 1$; $m$, again, may have the value of zero. As in respect of Formula I the absolute values of the symbols $m$, $n$, $c$ and $d$ are a corollary of the conditions in respect of the composition of the mixed block polymer.

The siloxane block of an average molecule may contain 10 to 300 silicon atoms. The polyoxyalkylene blocks may be within the molecular weight range of between 750 and 4,500.

The preparation of the compounds of Formula I is disclosed in U.S. Pat. No. 3,115,512 while the preparation of the compounds of Formula II is disclosed in U.S. Pat. Nos. 3,402,192 and 3,398,104.

As previously stated, the inventive composition or agent may additionally contain emulsifiers which facilitate the working-in of the preparations into aqueous systems. The presence of emulsifiers may also render it possible to prepare a master emulsion which is added to the systems to be defoamed either in concentrated or diluted form. The term "HLB value" as used hereinbefore, is, of course, well recognized in the art, HLB being an abbreviation for "hydrophile-lyophile balance". (See, for example, Emulsion Theory and Practice by Becher, Reinhold, 1965) The HLB value thus characterizes the hydrophily or hydrophoby of an emulsifier. See also W. C. Griffin, "Classification of Surface-Active Agents by HLB" in Journal of the Society of Cosmetic Chemists, Volume 1, p, 311 (1950).

The non-ionogenic emulsifiers which are optionally contained in the inventive preparation, should have an average HLB value of 8 to 14. Emulsifiers of a single type or emulsifier mixtures may be used. Examples for such emulsifiers are oxethylated fatty alcohols, oxethylated fatty acids, oxethylated hydroxy-fatty-acid-triglycerides, oxethylated glycerine-mono-fatty-acid-esters, and the like.

Inventive compositions which contain, in addition to the block polymer and the silica or alumina, silicon-free oily substances, are distinguished in respect of their defoaming activity by a distinct synergism, which will be demonstrated in the following comparison tests. Examples 6 to 10 indicate that the inventive composition or preparation containing the inventive block polymer is superior to defoaming preparations which, with otherwise the same composition, contain mixed block polymers which do not correspond to the inventive composition, but are outside the disclosed and claimed region, or, which instead of the inventive block polymer contain silicone oils which are devoid of polyoxyalkylene blocks.

The invention will now be described by several Examples, it being understood that these Examples are given by way of illustration and not by way of limitation and that many changes may be effected without affecting in any way the scope and spirit of the invention as recited in the appended claims.

EXAMPLE 1

Systems of the state of the art were compared with an inventive formulation pursuant to the following test:

An aqueous solution was prepared which contained 1 percent of a tenside mixture consisting of 2 parts of sodiumdodecylbenzenesulfonate and 1 part of an oxyethylated fatty alcohol mixture ($C_{12}$ to $C_{18}$) with an average content of 10 mole of ethyleneoxide per molecule. One liter of this aqueous solution was introduced into a measuring cylinder of 2 liter volume. 6 liters per minute of air was blown through the solution by means of a glass frit so that the air moved through the solution in the form of fine bubbles. This resulted in the foaming of the tenside solution until 1 liter of foam had been formed. After the air supply had been interrupted, 1 ml of a mixture consisting of 1 part of toluene and 1 part of defoamer was added to the solution by means of a pipette. This resulted in defoaming of the tenside solution whereupon again air was blown through the solution. The time was measured, which was necessary for producing 1,000 ml of foam. If the indicated amount of foam had not been obtained after 30 minutes, this is indicated in the following by stating the foam volume actually produced in ml.

Comparison Formulations

1. Spindle oil 60
2. 90 parts of spindle oil 60 and 10 parts of an oxethylated fatty alcohol having an HLB value of 11
3. 95 parts of spindle oil and 5 parts of pyrogenic silica which had been rendered hydrophobic and having an active surface of 200 $m^2/g$
4. 85 parts of spindle oil 60 and 5 parts of pyrogenic silica which had been rendered hydrophobic and had an active surface of 200 $m^2/g$ and 10 parts of an oxethylated fatty alcohol of an HLB value of 11

Inventive Formulation 5. 84 parts of spindle oil 60 and 5 parts of pyrogenic silica which had been rendered hydrophobic and having an active surface of 200 $m^2/g$ and 10 parts of an oxethylated fatty alcohol of an HLB value of 11 and 1 part of a methylpolysiloxane-polyoxypropylene mixed block polymer containing 25 percent by weight of dimethylsiloxy units corresponding to Formula I wherein $a = 6.5$, $b = 0$, $n = 27.5$ and $m = 0$. The symbol R has the meaning of a butyl group. The molecular weight of a polyoxyalkylene block amounted to 1665.

Table 1

| Effect of Formulations 1 to 5 according to above test | | |
| --- | --- | --- |
| 1000 ml foam after min/sec | or | Foam volume after 30 minutes |
| 1. 37 seconds | | |
| 2. 35 seconds | | |
| 3. 9 minutes | | |
| 4. | | 700 ml |
| 5. | | 90 ml |

The values reported above are average values of several measurements.

EXAMPLE 2

Pursuant to the test described in Example 1 the following formulations were investigated:

Comparison Formulations

6. Rape oil
7. 97 parts of rape oil and 5 parts of an oxethylated fatty alcohol of an HLB value of 10
8. 97.5 parts of rape oil and 2.5 parts of pyrogenic silica having a surface of 300 m²/g
9. 92.5 parts of rape oil and 5 parts of an oxethylated fatty alcohol having an HLB value of 10 and 2.5 parts of pyrogenic silica of a surface of 300 m²/g Inventive Formulation 10. 90 parts of rape oil and 5 parts of an oxethylated fatty alcohol of an HLB value of 10 and 2.5 parts of pyrogenic silica of a surface of 300 m²/g and 2.5 parts of a methylpolysiloxane-polyoxalkylene mixed block polymer, with 30% by weight of methylpolysiloxane and a weight ratio of polyethyleneoxide : polypropyleneoxide of 10 : 90 in the polyoxyalkylene blocks. This mixed block polymer corresponds in its structure to Formula II wherein $c = 5$, $d = 20$, $m = 1.9$, $n = 12.8$ and R stands for methyl. The molecular weight of the polyoxyalkylene block amounted to 900.

Table 2

| Effect of Formulations 6 to 10 | | |
|---|---|---|
| 1000 ml foam after min/sec | or | Foam volume after 30 minutes |
| 6. | 17 seconds | |
| 7. | 1 minute, 30 seconds | |
| 8. | 2 minutes, 37 seconds | |
| 9. | | 600 ml |
| 10. | | 30 ml |

The values reported above indicate average values obtained from several measurements.

EXAMPLE 3

A PVC dispersion was prepared according to a well-known emulsion polymerization procedure. The dispersion contained 30% by weight of solids and was tested in respect of its foaming capability without addition and with the addition of 0.1 percent by weight of a prior art defoamer as well as 0.1 percent by weight of a inventive defoamer.

By means of a glass frit, 6 liter per minute of air were introduced through 200 ml of dispersion, the dispersion being located in a measuring cylinder of 2000 ml volume. The time was determined, after which 1800 ml of foam volume had been formed. In the alternative, the foam volume was measured which had been obtained after 30 minutes.

The following Table 3 lists in line 1 those values, which were obtained without the addition of any defoaming agent. In line 2, the values are indicated which were obtained with the addition of a known polyethyleneoxide-polypropyleneoxide mixed polymer of the molecular weight 2200 having an HLB value of 3. Line 3 lists the values which are obtained with the addition of an inventive defoamer. The inventive defoamer consisted of 89 parts of soy oil, 5.5 parts of the polyethersiloxane mixed block polymer described in Example 2, 2.5 parts of a highly disperse pyrogenic mixed oxide consisting of 82% of SiO₂ and 18% of Al₂O₃ and 3 parts of an oxethylated cetyl alcohol having an HLB value of 10.5.

Table 3

| Defoaming of a PVC Dispersion | | |
|---|---|---|
| | 1800 ml foam after minutes or | Foam volume after 30 minutes |
| 1. without defoamer | 2 minutes | |
| 2. conventional defoamer | 9 minutes | |
| 3. inventive defoamer | | 500 ml |

EXAMPLE 4

The following experiment was carried out for the purpose of defoaming a precipitating bath used for viscose spinning:

An aqueous solution was prepared which contained 200 g/l of sodium sulfate, 90 g/l of concentrated sulphuric acid and 2 g/l of a fatty aminepolyglycolether of an HLB value of 9.5 as wetting agent. In a laboratory spinning plant, simulating actual production conditions and after the addition of 15 ppm of the inventive defoamer described in Example 1, complete avoidance of foam was obtained. By contrast, when a prior art defoamer in the nature of butylglycolphosphate was used, complete foam freedom was obtained after addition of 80 ppm only.

EXAMPLE 5

A number of customary baths as they are used in the treatment of textiles were prepared. These baths, in the absence of defoamers, usually cause serious foaming problems. To each of these baths were added 0.1 percent of the inventive defoamer of Example 2. According to the impact foam method DIN 53,902, the foam heights which were obtained with and without defoaming addition were determined and compared.

A. Bleaching Bath 3 g/l of sodium chlorite
0.3 g/l of sodium pyrophosphate
0.4 cm³/l of formic acid (80% concentration)
1.2 g/l of sodiumnonylbenzenesulfonate
Measured foam volume at 70° C:
without defoamer — 150 ml
with defoamer — 35 ml B. Alkaline Dyeing Bath 6.0 cm³/l sodium hydroxide solution (38° Be.)
1.5 g/l sodiumhydrogensulfite
6.0 g/l of Glauber's salt
1.4 g/l sodiumdodecylbenzenesulfonate
Measured foam volume at 70° C:
without defoamer — 120 ml
with defoamer — 20 ml C. Neutral Dyeing Bath 1.2 g/l sodiumdodecylbenzenesulfonate
Measured foam volume at 70° C:
without defoamer — 220 ml
with defoamer — 5 ml

EXAMPLE 6

An inventive formulation was prepared as follows:

70 parts of soy oil
15 parts of white oil 5° E
7.5 parts of an oxethylated fatty alcohol mixture ($C_{12}$ to $C_{18}$) with an HLB value of 10
3 parts of pyrogenic silica of a specific surface of 150 $m^2/g$ and
4.5 parts of a methylpolysiloxane-polyoxypropylene mixed block polymer (Formulation A).

In this formulation and for comparison purposes, the mixed block polymer was substituted by siloxane additions outside the scope of the present invention (Formulations B and C).

The siloxanes of A, B and C had the following structure and composition:

In Formulation A:

Mixed block polymer corresponding to Formula I wherein $a = 6$, $b = 2.1$, $m = 0$, $n = 30$ and $R = C_4H_9$.

In Formulation B:

Polydimethylsiloxane with terminal trimethylsilyl groups; the formula of the average molecule is

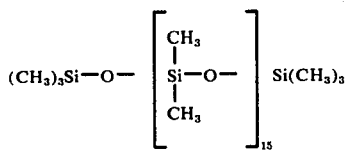

In Formulation C:

Mixed block polymer corresponding to Formula I, however, with values outside the scope of the present invention, to wit, $a = 5$, $b = 2$, $m = 18$, $n = 18$ and $R = C_4H_9$.

Pursuant to the test described in connection with Examples 1 and 2, the defoaming effect in respect of an aqueous solution containing 0.1% of the tenside mixture of Example 1 was investigated. In variance from the conditions of Example 1, the measuring method, in addition to the tenside concentration and the dosage amount, were different. The defoamer quantities which were used in this comparison test amounted to 10 ppm while the measuring time was 3 hours. The following time periods after which 1000 ml of foam had been formed, were measured:
A: >3 hours (thereafter discontinued)
B: 2 hours, 35 minutes
C: 1 hour, 8 minutes.

EXAMPLE 7

The following formulations were examined according to the test disclosed in Example 1:

Comparison Formulations 11. 92.5 parts by weight of polyoxypropylenemonobutylether (mole weight ~ 1760), enriched with 7.5 parts by weight of pyrogenic silica which had been rendered hydrophobic and which had an active surface of 200 $m^2/g$.

12. 92.5 parts by weight of a methylpolysiloxane-polyoxyalkylene mixed block polymer, enriched with 7.5 parts by weight of pyrogenic silica which had been rendered hydrophobic and which had an active surface of 200 $m^2/g$. The methylpolysiloxane-polyoxyalkylen mixed block polymer corresponds in its structure to Formula I. In the specific polymer as used herein, $a = 6$, $b = 2$, $n = 18$, $m = 11$ and $R = C_4H_9$. The polyoxyalkylene block had a molecular weight of ~ 1600 and had a weight ratio of polyethyleneoxide : polypropyleneoxide of 30 : 70.

Inventive Formulations 13. 92.5 parts by weight of a methylpolysiloxane-polyoxyalkylene mixed block polymer according to Formula I, wherein $a = 6$, $b = 2$, $n = 30$, $m = 0$ and $R = C_4H_9$. The block polymer was enriched with 7.5 parts by weight of a pyrogenic silica which had been rendered hydrophobic and which had an active surface of 200 $m^2/g$.

14. 92.5 parts by weight of methylpolysiloxane-polyoxyalkylene mixed block polymer, enriched with 7.5 parts by weight of a pyrogenic silica which had been rendered hydrophobic and having an active surface of 200 $m^2/g$. The methylpolysiloxane-polyoxyalkylene mixed block polymer corresponded in its structure to Formula I. In the specific compound here used, $a = 6$, $b = 2$, $n = 21$, $m = 6$ and $R = C_4H_9$. The polyoxyalkylene block had a molecular weight of ~ 1600 and had a weight ratio of polyethyleneoxide : polypropyleneoxide of 18 : 82.

15. 20.0 parts by weight of a methylpolysiloxane-polyoxyalkylene mixed block polymer corresponding to Formula I, wherein $a = 6$, $b = 2$, $n = 30$, $m = 0$ and $R = C_4H_9$, and 72.5 parts by weight of a polyoxypropylenemonobutylether, enriched or filled with 7.5 parts by weight of a pyrogenic hydrophobic silica having an active surface of 200 $m^2/g$.

Table 4

| | Effect of Formulations 11 through 15 1000 ml foam after min/sec |
|---|---|
| 11. | 40 seconds |
| 12. | 1 minute, 10 seconds |
| 13. | 62 minutes |
| 14. | 41 minutes |
| 15. | > 180 minutes |

EXAMPLE 8

The activity of inventive defoamers in comparison with a silicone defoamer on the basis of dimethylpolysiloxane having terminal trimethylsilyl groups was determined in synthetic resin dispersions as they are used, for example, in the production of emulsion paints and/or for adhesive connection or coating of textile surface structures. The evaluation of the test was effected according to two different criteria:

a. the foam preventing effect pursuant to the stirring test described below was determined, and b. it was examined whether the employed defoamers have an injurious effect on the films which are produced from the defoamer-containing synthetic resin dispersions. Such deleterious or injurious effect can, for example, be by way of crater formation or matting or dulling. Such effects are undesired in the further processing of synthetic resin dispersions and if they occur they significantly limit the use of defoamers and in some instances prevent the use of defoamers altogether.

Description of the Stirring Test 100 ml of dispersion were stirred in a beaker glass of a diameter of about 80 mm, with a turbine stirrer (diameter 40 mm) with a peripheral speed of 3.75 m/sec for a period of 5 minutes. Immediately after the stirring has been terminated, the foamed dispersion is transferred into a 50 ml volume measuring cylinder up to the indication marking and, by weighing, the weight of the measured amount of dispersion is determined. The weight is, of course, dependent on the amount of air which has been introduced by the stirring and thus is a measure for the activity of the defoamer.

Description of the Plate Test 10 ml of dispersion are distributed over a carefully cleaned glass plate by rapid to and fro rolling with a lambskin roller. The wet film thus obtained is observed in respect of foam bubbles, fish eyes and crater formation. The films are then dried in a dustfree room and the airdried films are observed in respect of changes or defects.

Comparison Formulations 16. 92.5 parts by weight of a polydimethylsiloxane having terminal trimethylsilyl groups (viscosity 1000 cP), enriched with 2.5 parts by weight of pyrogenic silica which had been rendered hydrophobic and having an active surface of 200 m$^2$/g.

17. 92.5 parts by weight of a methylpolysiloxane-polyoxyalkylene mixed block polymer, enriched with 7.5 parts by weight of pyrogenic silica which had been rendered hydrophobic and having an active surface of 200 m$^2$/g. The methylpolysiloxane-polyoxyalkylene mixed block polymer corresponds in its structure to Formula I in which $a = 6$, $b = 2$, $n = 18$, $m = 11$ and R = $C_4H_9$. The polyoxyalkylene block had a molecular weight of ~ 1600 and has a weight ratio of polyethyleneoxide : polypropyleneoxide of 30 : 70.

Inventive Formulations 18. 92.5 parts by weight of a methylpolysiloxane-polyoxyalkylene mixed block polymer corresponding to Formula I in which $a = 6$, $b = 2$, $n = 30$, $m = 0$ and R = $C_4H_9$ and enriched with 7.5 parts by weight of a pyrogenic silica which had been rendered hydrophobic and having an active surface of 200 m$^2$/g.

19. 92.5 parts by weight of a methylpolysiloxane-polyoxyalkylene mixed block polymer, filled with 7.5 parts by weight of a pyrogenic silica which had been rendered hydrophobic and having an active surface of 200 m$^2$/g. The methylpolysiloxane-polyoxyalkylene mixed block polymer corresponds to Formula I wherein $a = 6$, $b = 2$, $n = 21$, $m = 6$ and R = $C_4H_9$. The polyoxyalkylene block had a molecular weight of ~ 1600 and had a weight ratio of polyethyleneoxide : polypropyleneoxide of 18 : 82.

20. 20.0 parts by weight of a methylpolysiloxane-polyoxyalkylene mixed block polymer corresponding to Formula I, wherein $a = 6$, $b = 2$, $n = 30$, $m = 0$ and R = $C_4H_9$, and 72.5 parts by weight of a polyoxypropylenemonobutylether enriched with 7.5 parts by weight of a pyrogenic silica which had been rendered hydrophobic an having an active surface of 200 m$^2$/g.

Characterization of the employed Synthetic Resin Dispersions

Dispersion A: finely dispersed, anionactive, softener-free dispersion of a mixed polymer of different acrylic acid esters Dispersion B: softener-free, slightly anionactive dispersion of an acrylate-styrene-mixed polymer Dispersion C: finely dispersed anionactive/non-ionogenic dispersion of a styrene-butadiene-mixed polymer.

The results are indicated in Table 5.

Table 5

| | | Defoamer | Stirring Test | Plate Test | |
|---|---|---|---|---|---|
| | Formulation | g Defoamer per 100 g Resin | Weight/50 ml Stirred Dispersion | Wet Film | Dry Film |
| Dispersion A | | without | 28.5 | many bubbles | irregular surface |
| | 16 | 0.2 | 48.0 | no bubbles fish eyes | fish eyes and crater |
| | 17 | 0.2 | 35.0 | many bubbles | irregular surface |
| | 18 | 0.2 | 48.0 | no bubbles no fish eyes | smooth, shiny |
| | 19 | 0.2 | 48.0 | no bubbles no fish eyes | smooth, shiny |
| | 20 | 0.2 | 48.0 | no bubbles no fish eyes | smooth, shiny |
| Dispersion B | | without | 22.6 | many bubbles | irregular surface |
| | 16 | 0.2 | 47.5 | no bubbles fish eyes | fish eyes and crater |
| | 17 | 0.2 | 31.0 | many bubbles | irregular surface |
| | 18 | 0.2 | 48.0 | no bubbles no fish eyes | smooth, shiny |
| | 19 | 0.2 | 48.5 | no bubbles no fish eyes | smooth, shiny |
| | 20 | 0.2 | 48.5 | no bubbles no fish eyes | smooth, shiny |
| Dispersion C | | without | 31.0 | many bubbles | irregular surface |
| | 16 | 0.2 | 48.5 | no bubbles fish eyes | fish eyes and crater |
| | 17 | 0.2 | 40.0 | many bubbles | irregular surface |
| | 18 | 0.2 | 48.5 | no bubbles no fish eyes | smooth, shiny |
| | 19 | 0.2 | 48.5 | no bubbles no fish eyes | smooth, shiny |
| | 20 | 0.2 | 48.5 | no bubbles no fish eyes | smooth, shiny |

EXAMPLE 9

According to the following test, the inventive formulation described below was examined in a fermentation substrate from a biological steroid transformation process:

200 g of a fermentation substrate are weighed into a glass vessel of a diameter of 60 mm. With a turbine stirrer of a diameter of 40 mm, and having a circumference of ≧ 12.5 cm, agitation was effected with a peripheral speed of about 3 m/sec. At the same time and by means of a gas introducing frit, 1 liter of air per minute were blown or forced through the substrate at 20° C. By adding 0.1% of the inventive formulation, excessive foaming was prevented. Excessive foaming indicates for this purpose the formation of a foam height of > 5 mm during the length of the procedure of about 50 to 60 hours. The inventive preparation consisted of 92.5 parts of a methylpolysiloxane-polyoxypropylene mixed block polymer of Formula I, wherein $a = 6$, $b = 2.1$, $m = 0$, $n = 30$ and $R = C_4H_9$, and 7.5 parts of a pyrogenic silica which had been rendered hydrophobic and having an active surface of 200 m²/g. The growth of the micro-organisims which cause the fermentation was in no way impeded by the presence of the inventive defoaming preparation.

The test was then repeated for comparison purposes with the same formulation, wherein, however, the mixed block polymer of the invention was replaced by a polydimethylsiloxane having trimethylsilyl terminal groups and a viscosity of 1000 cP. The comparison is indicated in the following Table:

| Defoamer | Amount | Foam Height 5 mm After: |
|---|---|---|
| Without Silicone | — | ca. 1 hour |
| Defoamer | 0.1% | ca. 20 hours |
| Inventive Defoamer | 0.1% | ca. 68 hours |

EXAMPLE 10

The purpose of this test was to determine the change in effect of a defoamer according to Example 9 in latex paints during storage in comparison to silicone defoamer emulsions. The following procedure was adopted:

0.5% of the inventive formulation were, for the purpose of better distribution, dispersed with an equal amount of ethyl alcohol and the dispersion thus obtained was added to the latex paint under agitation. The testing of the activity of the inventive formulation was carried out after 1, 30, 60 and 90 days and was effected according to the following test procedure:

200 ml of the latex paint to be tested were diluted with water in the ratio of 1 : 1 and were introduced into a measuring cylinder having a volume of 2 liters. The latex paint was then stirred with a propeller stirrer at 2000 rpm for 6 minutes. The foam height obtained in this manner was measured in mm ($h_0$). After the addition of the defoamer and repeated stirring, the foam height was again determined after 1, 5, 15 and 30 minutes ($h_t$). The defoaming can be calculated as follows:

$$100 - \left[100 \cdot \frac{\Sigma h_t}{4 h_0}\right] = \% \text{ defoaming}$$

Due to the stirring which has a pronounced shearing force effect, a foam of very fine bubbles is formed whose height can be measured very exactly within 1 mm. The differences between the defoaming substances can thus be well appreciated in this manner. The results are tabulated in the following Table:

| Defoamer | Dispersed in | Amount | Defoaming in % after storage for 1 | 30 | 60 | 90 days |
|---|---|---|---|---|---|---|
| Without Silicone Defoaming | — | — | 38 | 35 | 34 | 36 |
| Emulsion | Water | 0.5% | 63 | 54 | 46 | 41 |
| Inventive Defoamer | $C_2H_5OH$ | 0.5% | 75 | 83 | 85 | 81 |

What is claimed is:

1. In a method for preventing the formation of foam and destroying existing foam in an aqueous solution or dispersion wherein an effective amount of defoaming composition composed of an oil, highly dispersed silica and a defoaming substance of a polyoxyalkylene-polysiloxane block copolymer is used, the improvement which comprises said block copolymer consisting essentially of
   a. about 10 to 60 % by weight of methylpolysiloxane and
   b. with the balance polyoxyalkylene, said polyoxyalkylene block consisting of oxypropylene units and said block copolymer having the formula:

Formula I

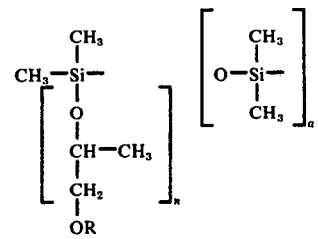

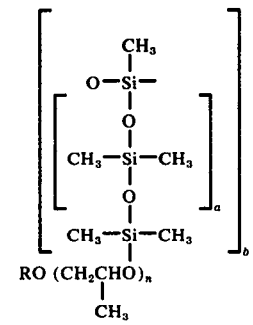

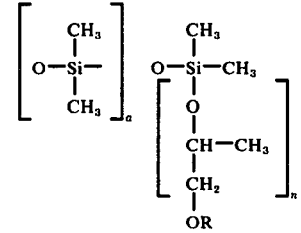

wherein
R is alkyl, acyl, aryl or R'—NH—CO—, wherein R' stands for aryl or alkyl,
$a$ and $n$ have finite values and the absolute values for $n$, $a$ and $b$ are the corollary of conditions (a) and (b); or the formula Formula II -continued

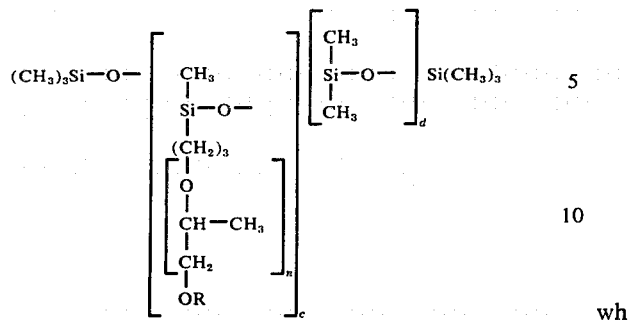

wherein R is alkyl, acyl, aryl or R′—NH—CO—, wherein R′ is alkyl or aryl,
 c ≧ 1, and the absolute values for n, c, and d are the corollary of conditions (a) and (b).

2. The method of claim 1 wherein the weight ratio of oil to block copolymer is 1 : 100.

3. The method of claim 1, wherein the composition additionally comprises 2 to 10 percent by weight, calculated on the total system, of a non-ionogenic emulsifier having an HLB value of 8 to 14, said emulsifier being soluble or dispersible in the system.

4. The method of claim 1, wherein R is alkyl of 1–4 carbon atoms, acetyl or phenyl and R′ is alkyl of 1–4 carbon atoms or phenyl.

5. The method of claim 1, wherein $b$ and $m$ of formula I are zero.

6. The method of claim 1, wherein in formula I $a = 6$, $b = 2.1$, and $n = 30$.

7. In a defoaming composition of the type composed of an oil, highly dispersed silica and a defoaming substance of a polyoxyalkylene-polysiloxane block copolymer, the improvement which comprises said block copolymer consisting essentially of
 a. about 10 to 60 % by weight of methylpolysiloxane; and
 b. with the balance of polyoxyalkylene, said polyoxyalkylene block consisting of oxypropylene units and said block copolymer having the formula:

Formula 1

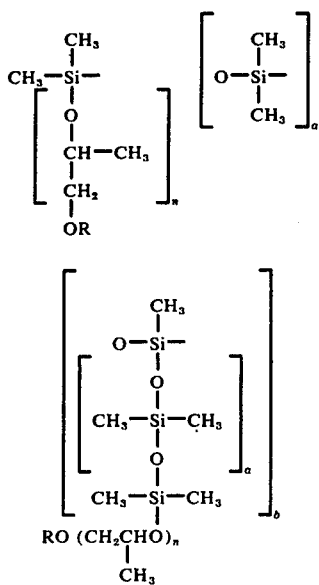

-continued

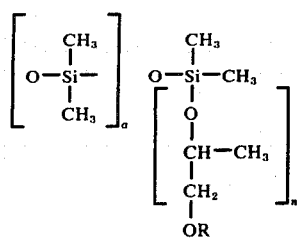

wherein
R is alkyl, acyl, aryl or R′—NH—CO—, wherein R′ stands for aryl or alkyl,
$a$ and $n$ finite values and the absolute values for $n$, $a$ and $b$ are the corollary of conditions (a) and (b); or the formula Formula II

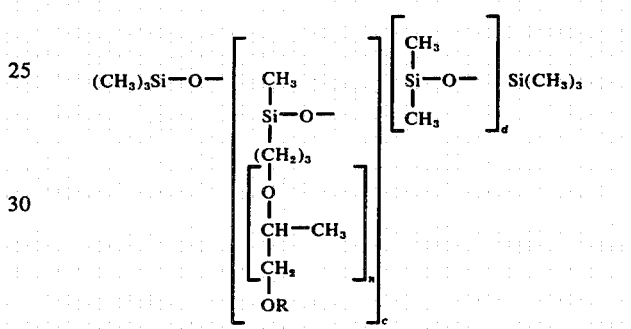

wherein
R is alkyl, acyl, aryl or R′—NH—CO—, wherein R′ is alkyl or aryl,
$c \geq 1$, and the absolute values for $n, c,$ and $d$ are the corollary of conditions (a) and (b).

8. A defoaming composition as claimed in claim 7, wherein b and m of formula I are zero.

9. A defoaming composition as claimed in claim 7, wherein in formula I, $a = 6$, $b = 2.1$, and $n = 30$.

10. A defoaming preparation as claimed in claim 7, further comprising
 2 to 10 percent by weight calculated on the total weight of the preparation, of a non-ionogenic emulsifier having an HLB value of 8 to 14, said emulsifier being soluble or dispersible in the preparation.

11. A defoaming preparation as claimed in claim 7, wherein R is alkyl of 1–4 carbon atoms, acetyl or phenyl and R′ is alkyl of 1–4 carbon atoms or phenyl.

12. A defoaming composition as claimed in claim 7, wherein the block polymer comprises 15 to 30 percent by weight of methylpolysiloxane.

13. A defoaming composition as claimed in claim 7, wherein the siloxane blocks of an average molecule have 10–300 silicon atoms while the molecular weight of polyoxyalkylene blocks is in the range of 750–4500.

* * * * *

UNITED STATES PATENT OFFICE
CERTIFICATE OF CORRECTION

Patent No. 4,028,218   Dated June 7, 1977

Inventor(s) Hans-Ferdi Fink, et al

It is certified that error appears in the above-identified patent and that said Letters Patent are hereby corrected as shown below:

Column 14, Claim 1 and Column 15, Claim 7, Structural Formula I should appear as follows:

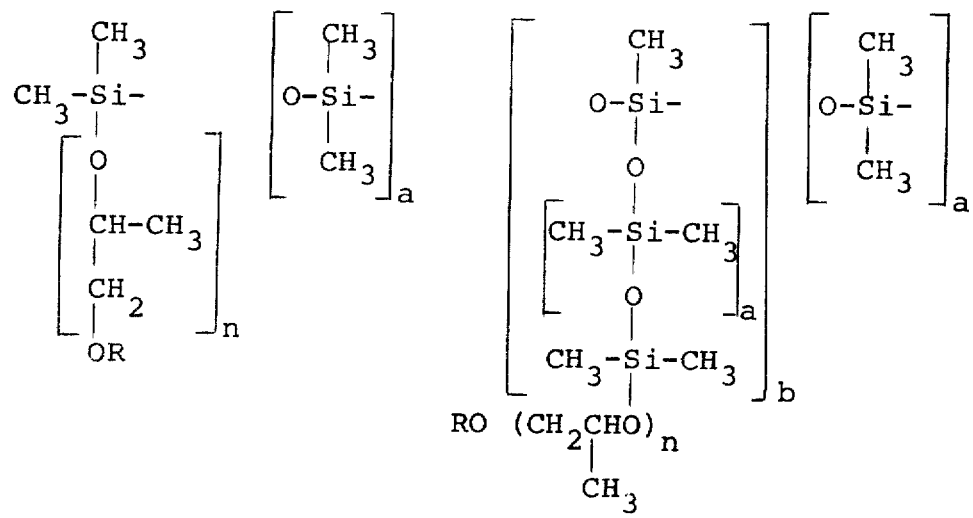

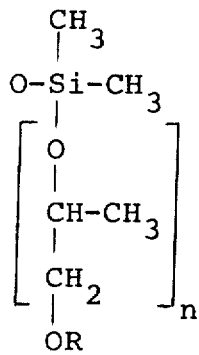

UNITED STATES PATENT OFFICE
CERTIFICATE OF CORRECTION

Patent No. 4,028,218     Dated June 7, 1977

Inventor(s) Hans-Ferdi Fink, et al

It is certified that error appears in the above-identified patent and that said Letters Patent are hereby corrected as shown below:

Column 15, Line 20, change "1 : 100" to --100 : 1-- ;

Line 29, delete "and m";

Line 30, change "are" to --is--.

Signed and Sealed this

Eighteenth Day of April 1978

[SEAL]

Attest:

RUTH C. MASON
*Attesting Officer*

LUTRELLE F. PARKER
*Acting Commissioner of Patents and Trademarks*